(12) United States Patent
Brown et al.

(10) Patent No.: US 10,833,405 B2
(45) Date of Patent: Nov. 10, 2020

(54) METHOD OF TRACKING STEERABLE ANTENNAS ON PLATFORMS TO FORM AN RF COMMUNICATION LINK

(71) Applicant: Raytheon Company, Waltham, MA (US)

(72) Inventors: Kenneth W. Brown, Yucaipa, CA (US); Alan Rattray, Georgetown, TX (US); Travis B. Feenstra, Calimesa, CA (US); Samuel De La Torre, La Habra, CA (US); Johan A. Kullstam, Marlborough, MA (US); Arlin L. Pierce, San Antonio, TX (US)

(73) Assignee: Raytheon Company, Waltham, MA (US)

( * ) Notice: Subject to any disclaimer, the term of this patent is extended or adjusted under 35 U.S.C. 154(b) by 278 days.

(21) Appl. No.: 15/760,429

(22) PCT Filed: Jul. 21, 2016

(86) PCT No.: PCT/US2016/043396
§ 371 (c)(1),
(2) Date: Mar. 15, 2018

(87) PCT Pub. No.: WO2017/099851
PCT Pub. Date: Jun. 15, 2017

(65) Prior Publication Data
US 2018/0277948 A1    Sep. 27, 2018

Related U.S. Application Data

(60) Provisional application No. 62/266,291, filed on Dec. 11, 2015.

(51) Int. Cl.
H01Q 3/20    (2006.01)
H01Q 3/18    (2006.01)
(Continued)

(52) U.S. Cl.
CPC ............... *H01Q 3/20* (2013.01); *H01Q 3/10* (2013.01); *H01Q 3/18* (2013.01); *H01Q 19/10* (2013.01); *H04B 7/0617* (2013.01); *H01Q 19/19* (2013.01)

(58) Field of Classification Search
CPC .. H01Q 3/20; H01Q 3/18; H01Q 3/10; H01Q 19/10; H04B 7/0617
(Continued)

(56) References Cited

U.S. PATENT DOCUMENTS

5,929,808 A    7/1999  Hassan et al.
2007/0031151 A1*  2/2007  Cunningham ..... H04B 10/1123
                                                         398/131
(Continued)

*Primary Examiner* — Ayodeji O Ayotunde
(74) *Attorney, Agent, or Firm* — Schwegman Lundberg & Woessner, P.A.

(57) ABSTRACT

Steerable antenna on platforms, fixed or mobile, are tracked to form an RF communication link by setting the width of the main lobe of the antenna beam pattern to be greater than the initial pointing uncertainty region and then concurrently scanning and progressively reducing the widths of the main lobes as the pointing uncertainty region is reduced to first acquire and then track the opposing antenna. The width of the main lobe is reduced such that the width of the main lobe is approximately fixed for each block. The antennas at opposite ends of the communication link may be scanned with scan patterns that are orthogonal to each other such that the demodulation of the received signal levels to signal direction of arrival at each platform is solely a function of the scan pattern of the receive antenna.

22 Claims, 9 Drawing Sheets

(51) Int. Cl.
 *H04B 7/06* (2006.01)
 *H01Q 3/10* (2006.01)
 *H01Q 19/10* (2006.01)
 *H01Q 19/19* (2006.01)

(58) Field of Classification Search
 USPC .................................................... 455/562.1
 See application file for complete search history.

(56) References Cited

U.S. PATENT DOCUMENTS

| | | | |
|---|---|---|---|
| 2010/0302101 A1 | 12/2010 | Leiba et al. | |
| 2012/0068880 A1* | 3/2012 | Kullstam | H01Q 3/26 342/54 |
| 2015/0222345 A1* | 8/2015 | Chapman | H04W 36/00 370/332 |
| 2016/0127919 A1* | 5/2016 | Hui | H04W 16/28 342/371 |

* cited by examiner

METHOD OF TRACKING STEERABLE ANTENNAS ON PLATFORMS TO FORM AN RF COMMUNICATION LINK

CROSS REFERENCE TO RELATED APPLICATION

This application claims priority under 35 U.S.C. Section 120 to the following U.S. Provisional Patent Application No. 62/266,291 that was filed on Dec. 11, 2015 and entitled, "METHOD OF TRACKING STEERABLE ANTENNAS ON PLATFORMS TO FORM AN RF COMMUNICATION LINK."

GOVERNMENT LICENSE RIGHTS

The U.S. Government has a paid-up license in this invention and the right in limited circumstances to require the patent owner to license others on reasonable terms as provided for by the terms of contract number HR0011-12-C-0091 awarded by the Department of Defense.

BACKGROUND OF THE INVENTION

Field of the Invention

This invention relates to pointing, acquisition and tracking of steerable antennas on mobile platforms to form an RF (radio frequency) communication link, and more particularly to a method of concurrently scanning and progressively reducing the main antenna beam width on a pair of mobile platforms to establish track and form a communication link.

Description of the Related Art

Steerable antenna on a mobile platform must point, acquire and track antenna on a fixed, or slowly moving platform, to establish an RF communication link. For example, steerable antenna on a ship or aircraft must track an antenna on the ground or a satellite. Gimbaled or phased-array systems are examples of steerable antennas.

In a typical scenario, the mobile platform will receive periodic updates of its GPS coordinates and those of the target platform (if not fixed). The mobile platform will also typically include an internal navigation system (INS) to provide higher rate updates of its own position and orientation. Based on this information, the mobile platform can determine an initial pointing direction of the steerable antenna toward the fixed platform.

To establish a high data rate communication link, the antenna beam must exhibit high gain, hence it must have a narrow beam width, typically on the order of a degree. Unfortunately, for high-frequency RF signals, those in excess of approximately 1 GHz, the pointing uncertainty region of the initial pointing direction is typically larger than the beam width. Therefore, there is no guarantee that the initial pointing direction will result in the main lobe of the antenna beam pointing at the antenna on the fixed platform. In fact, it is more likely that the antenna sidelobes will be pointing at the opposing antenna, which can cause critical failure for tracking.

To acquire the opposing antenna within the steerable antenna's main lobe, the mobile platform's narrow beam is scanned in a scan pattern (e.g. raster or outward spiral) over the volume defined by the initial pointing uncertainty region looking for a return. A coarse correction to the pointing direction is made based on the maximum return. This correction is adequate to ensure that the main lobe is pointing at the antenna on the fixed platform but is not sufficient to establish and maintain track to provide the highest gain, hence maximum data rate communication link. The pointing uncertainty region has been reduced but not enough.

To track the opposing antenna, the narrow beam is scanned in a scan pattern over a smaller volume defined by the updated pointing uncertainty region to ensure the measured returns are on the antenna main lobe. The received signal level is sampled over at least one complete scan pattern. Each block of data is processed to compute Azimuth and Elevation pointing direction corrections toward the target antenna on the fixed platform. This process iterates, possibly on smaller volumes, as the pointing direction moves toward the target antenna and the pointing uncertainty region is reduced. The process incorporates periodic updates to the platform GPS coordinates and the antenna orientation provided by the INS. The track algorithms are built on the assumption that the returns are on the antenna main lobe. If the returns are actually on the antenna side lobes the track algorithm will fail.

The Defense Advanced Research Projects Agency (DARPA) issued a broad agency announcement (DARPA BAA) 12-23 on Feb. 10, 2012 directed to "Mobile Hotspots", in which it announced a need for technology to support an ad hoc communications network that can be put over a battlespace at a moments notice with the capacity and range needed to connect remote and mobile warfighters with forward operation bases, higher-echelon tactical operations centers, and remote intelligence, surveillance, and reconnaissance sources, and fixed communications infrastructure. A pair of steerable bi-directional E-band Transceivers with Pointing, Acquisition and Tracking (PAT) is part of Phase 1 Technology Development. The E-band communication band is split into two "low and high" sub-bands of approximately 71-76 GHz and 81-86 GHz. DARPA considers this to be "technology hard".

Steerable antennas on a pair of mobile platforms complicate pointing, acquisition and tracking. Each antenna has an initial pointing uncertainty region larger than its beam width. In these scenarios, during acquisition mode, transmit and receive antennas will each need to execute a search pattern (using perhaps a raster or spiral scan) to acquire the other antenna. If the transmit and receive antenna search sequences are un-coordinated, one must rely on luck or persistence to find the appropriate azimuth and elevation angles that align both transmit and receive main lobes to detect a return sufficient for a coarse correction to the pointing direction sufficient to enter track mode. This uncertainty and the delay of acquiring both antennas is a problem that most be overcome to support the ad hoc communications network for Mobile Hotspots.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a method of pointing and tracking steerable antennas on platforms, fixed or mobile, to form a communication link, effectively bypassing the standard acquisition mode.

This is accomplished by setting the width of the antenna main lobe greater than the initial pointing uncertainty region and then concurrently scanning and progressively reducing the widths of the antenna main lobes as the pointing uncertainty region is reduced to first acquire and than track the opposing antenna. Blocks of data representing the received signal levels for an approximately fixed beam width are processed to update the pointing direction and reduce the pointing uncertainty region. The extent of the scan pattern may be reduced with the reduction in width of antenna main lobe so that the received signal levels remain within the antenna main lobe. The scan patterns executed by each antenna are suitably orthogonal to each other to minimize interference associated with the scan pattern of the opposing antenna.

In an embodiment, each of a pair of platforms, fixed or mobile, includes a steerable RF transceiver antenna configured to transmit and receive with a beam pattern having a main lobe and side lobes. The antenna is configurable to vary the width of the main lobe. At each platform, from coordinates of both the first and second platforms and orientation of that platform, the transceiver determines a pointing direction towards the opposing RF transceiver antenna and a pointing uncertainty region. At each platform and concurrently, the transceiver sets the width of the main lobe greater than the pointing uncertainty region and scans the beam over a scan pattern to transmit an RF signal to and receive an RF signal from the RF transceiver on the other platform within the main lobe, acquires a block of received signal levels for at least one full scan pattern for an approximately fixed width of the main lobe, and processes a modulation of the received signal levels to update the pointing direction and reduce the pointing uncertainty region of the RF transceiver antenna to track the opposite RF transceiver antenna. The scan patterns of the opposing RF transceiver antennas are substantially orthogonal to each other for at least a primary component of the scan pattern (and preferably one or more harmonics) such that the demodulation of the received signal levels is a function of only the scan pattern of that transceiver antenna and not the scan pattern of the opposing transceiver antenna despite the signal level varying due to the scan pattern and a pointing error of both antennas within the pointing uncertainty region. The transceiver repeats the process with progressively narrower widths of the antenna main lobe greater than the reduced pointing error until the width of the main lobe reaches a high gain narrow beam width condition to form the RF communication link. The transceiver preferably scans progressively smaller extents of the scan pattern so that received RF signal remains within the main antenna beam.

In an embodiment, each steerable RF transceiver antenna comprises a gimbaled reflector-type antenna including a main reflector having a focal point, a sub-reflector nominally positioned at the focal point and an RF feed. The width of the main lobe is initially set by axially translating the sub-reflector away from the focal point to defocus the beam. The width of the main lobe is reduced by axially translating the sub-reflector towards the focal point to focus the beam.

In different embodiments, the RF communication link is formed between a pair of mobile platforms, a pair of fixed platforms or a mobile platform and a fixed platform. A multi-stage RF communication link may be formed from one or more of any of these paired links.

These and other features and advantages of the invention will be apparent to those skilled in the art from the following detailed description of preferred embodiments, taken together with the accompanying drawings, in which:

DETAILED DESCRIPTION OF THE INVENTION

As described in DARPA's broad agency announcement on "Mobile Hotspots" the performance of commercial wireless phones has increased dramatically as wireless service providers have moved from second generation (2G) to third generation (3G) and now fourth generation (4G) cellular telephones. Typical download speeds to the wireless cell phone have increased from 0.1 Mb/s for a typical 2G phone to over 10 Mb/s for some 4G phones today. However, insufficient bandwidth and backhaul capacity from the cellular base station to the core telecommunications infrastructure often prevents individual handsets from attaining high data rates on a regular basis. As users compete for available backhaul capacity the download speeds to the handsets degrade significantly. To overcome that limitation, wireless service providers are moving to microwave and millimeter-wave point-to-point links with typical backhaul capacities of 300 Mb/s and 1 Gb/s, respectively to provide higher levels of backhaul capacity.

The military has a similar need to extend capacity to the dismounted warfighter, especially at the company and platoon level. New generations of military tactical radios continue to enable increased capacity to local wireless networks, providing significant connectivity within several kilometers. While the new capabilities enable local information sharing among soldiers, it does not provide similar high-capacity, over-the-horizon connectivity with neighboring forward operation bases (FOBs), higher-echelon tactical operations centers (TOCs), and remote intelligence, surveillance, and reconnaissance (ISR) sources. Existing solutions for high-capacity communications at those distances either do not provide the needed bandwidth or are hosted on a few assets that are not readily accessible to platoon-level units.

Figure 1:
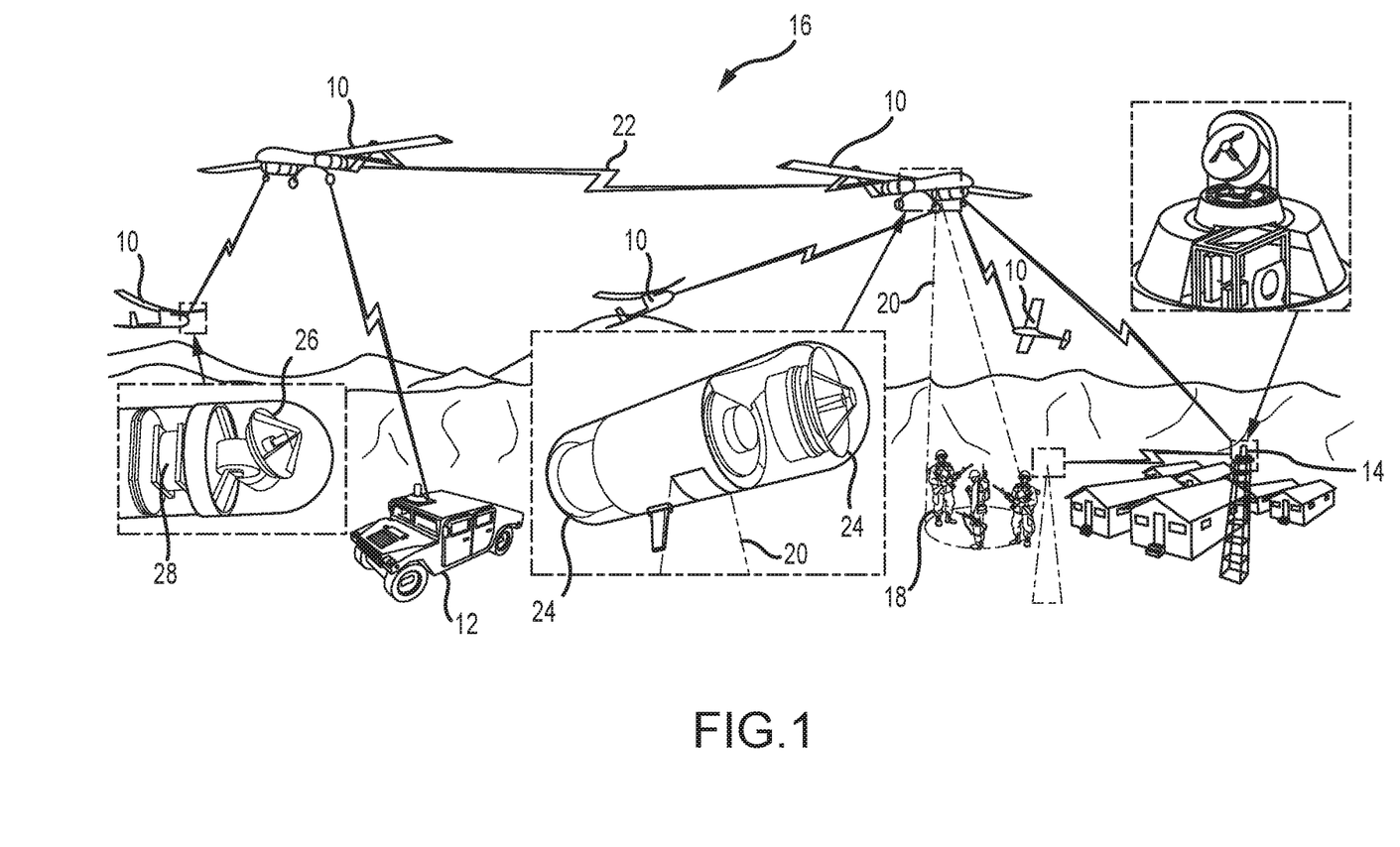
FIG. 1 is a diagram of an embodiment mobile hotspot ad hoc communication network of high data rate E-band communication links between steerable variable beam width transceivers.

The goal of the Mobile Hotspots program is to design, build and test a scalable mobile communications backbone with the capacity and range needed to connect remote and mobile warfighters with forward operation bases, higher-echelon tactical operations centers, and remote intelligence, surveillance, and reconnaissance sources, and fixed communications infrastructure, as shown schematically in FIG. 1. The program envisions aerial 10, mobile 12 and fixed 14 assets—most of which are organic to the unit—providing a gigabit-per-second or higher (e.g., >10 or >50 Gbps) tactical backbone network 16 that extends capacity to the lowest echelon warfighters 18. Each mobile hotspot contains an access point 20 for warfighter handsets or computers and multiple high data rate directional links 22 for interconnecting mobile hotspot nodes. Each directional link 22 is a steerable high-gain E-band reflector-type transceiver 24. Each transceiver includes a steerable antenna 26 and computer system 28 configured to execute a pointing, acquisition and tracking sequence to establish a high data rate RF communication link between a pair of fixed assets, mobile assets or mobile-to-fixed assets. The transceivers may use commercial radio protocols such as WiFi, WiMAX and LTE or military protocols. The transceivers are typically operating in high-frequency RF bands above approximately 1 GHz.

An object of the invention was to solve the pointing, acquisition and tracking problem posed by having steerable antennas on pairs of platforms, fixed or mobile, to reliably and quickly establish a high data rate communication link. The tracking algorithms assume each processed block of received signal levels (RSLs) lies within the main lobe, is acquired for a fixed width of the main lobe, and that a modulation of the received signal levels is solely a function of the scan pattern of the receive antenna.

The present invention achieves these objectives by setting the width of the main lobe of the antenna beam pattern to be greater than the initial pointing uncertainty region and then concurrently scanning and progressively reducing the widths of the main lobes as the pointing uncertainty region is reduced to first acquire and than track the opposing antenna. The width of the main lobe is either reduced in discrete steps between blocks (or every N blocks) or continuously but slowly such that the width of the main lobe is approximately fixed for each block. In an embodiment, approximately fixed is defined as a deviation of at most +/−10% from a nominal width of the main lobe for each block. The extent of the scan pattern is preferably reduced with the reduction in the width of the main lobe so that the received signal levels remain within the main lobe. The antennas at opposite ends of the communication link are preferably scanned with scan patterns that are orthogonal to each other such that the demodulation of the received signal levels to signal direction of arrival at each platform is solely a function of the scan pattern of the receive antenna on each platform despite the signal level varying due to the scan pattern and a pointing error of both antennas within the pointing uncertainty region.

Each platform includes a steerable RF transceiver antenna such as a gimbaled reflector-type antenna or a phased-array antenna. The transceiver antenna is configured to transmit and receive with a beam pattern having a main lobe and side lobes. The transceiver antenna must be configurable to vary the width of the main lobe. In a reflector type antenna, a sub-reflector nominally positioned at the focal point of the main reflector may be translated axially to defocus and focus the main lobe. The sub-reflector may be translated in discrete steps to change the width of the main lobe. The sub-reflector may be translated between only first and second positions to move from an initial low gain broad beam width condition to the high gain narrow beam width condition. The sub-reflector may be translated continuously from an initial low gain broad beam width condition to the high gain narrow beam width condition, wherein the rate of reduction is sufficiently slow that the width of the main lobe is approximately fixed for each block of received signal levels. In a phased array, the array may be defocused or reduced to a smaller sub-array to vary the width of the main lobe. Each mobile platform also includes a GPS receiver, an internal navigation system (INS) and a low data rate communication link such as a fixed omnidirectional antenna capable of transmitting and receiving GPS coordinates to and from other mobile platforms.

Figure 2:
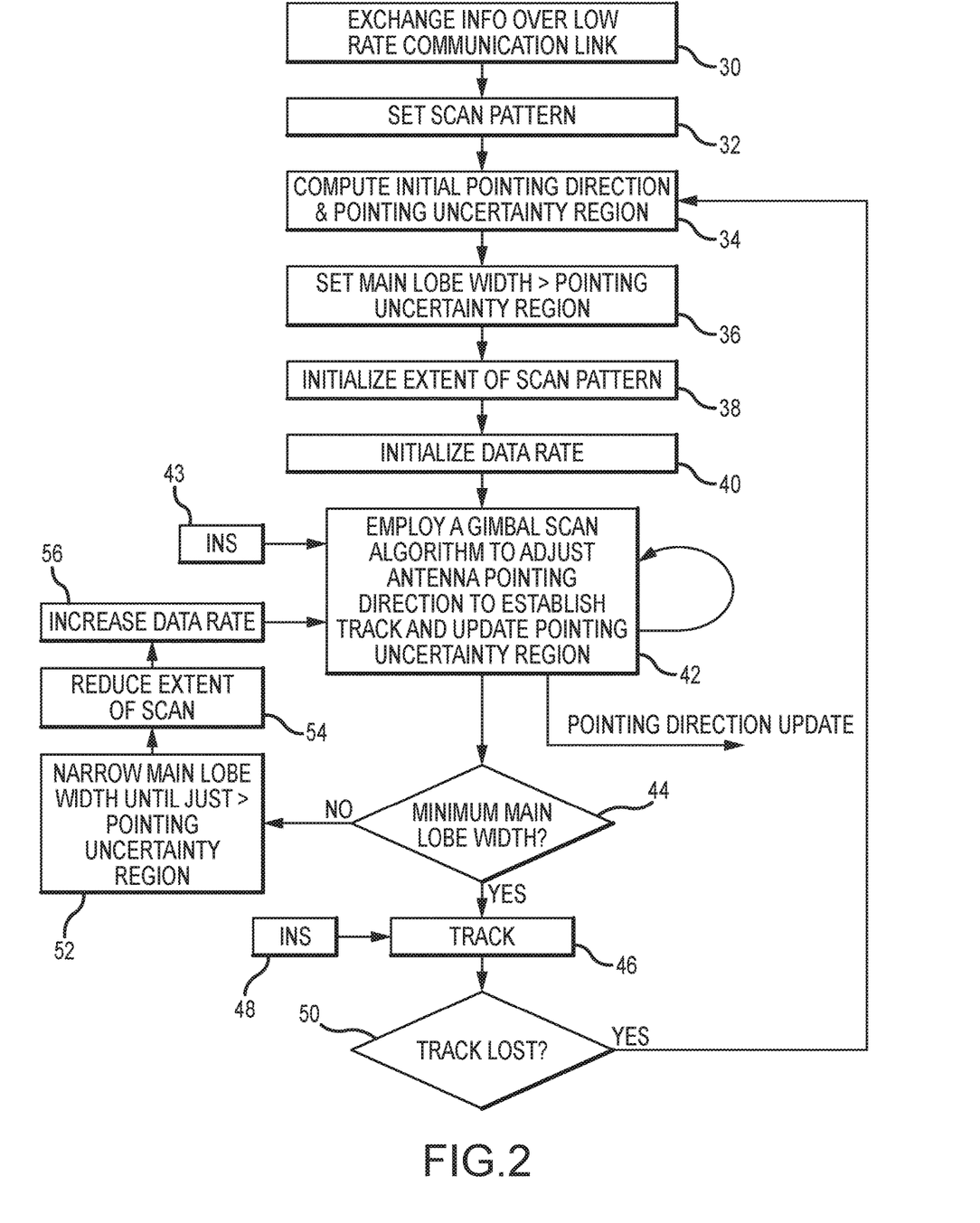
FIG. 2 is a flow diagram of an embodiment for pointing and tracking steerable antennas on platforms, fixed or mobile, to form a communication link.

An embodiment for pointing and tracking steerable transceiver antennas on platforms, fixed or mobile at opposite ends of a communications link is illustrated in FIG. 2. The platforms exchange information over a low data rate communication link such as provided by fixed omni-directional antennas (step 30). This information may include a join request and acceptance to establish a high data rate communications link, the GPS coordinates of each platform and the scan pattern to ensure orthogonality. Other than to receive periodic updates of the other platform's GPS coordinates, each platform operates independently although concurrently to steer its antenna to track the antenna on the other platform. The platforms are not synchronized but do execute the track algorithms at the same time (concurrently) to establish and maintain track at each end of the link.

At each platform, the computing system sets a scan pattern (step 32). The selection of the scan patterns is coordinated so that the scan patterns are orthogonal. The scan patterns of the opposing RF transceiver antennas are substantially orthogonal to each other for at least a primary component of the scan pattern such that the demodulation of the received signal levels to signal direction of arrival is a function of only the scan pattern of that transceiver antenna and not the scan pattern of the opposing transceiver antenna despite the signal level varying due to the scan pattern and a pointing error of both antennas within the pointing uncertainty region. In an embodiment, the scan patterns are substantially orthogonal to each other for the primary component and at least one harmonic component of the scan pattern. In an embodiment, substantially orthogonal is defined as a deviation of at most +/−10%. In an embodiment, the transceiver antennas are scanned over the scan pattern at different rates so that the scan patterns are orthogonal in frequency. In an embodiment, substantially orthogonal is defined as a deviation of at most +/−10%. For example, a pair of orthogonal frequencies may be given by frequency X and 1.5X, in which case the second frequency may deviate by at most +/−10%. In other embodiments, the scan patterns may be orthogonal in a manner other than frequency. For example, if each node is aware of the opposing node's scan pattern, the scan demodulator can be utilized to effectively cancel out interactions due to the far node. Time synchronization is another example, where the nodes take turns performing a scan pattern so modulation of the RSL is purely due to one node and interaction of the two does not exist.

Based on the GPS (or other) coordinates of both platforms and the orientation of the host platforms (as provided by its INS), the computing system computes an initial pointing direction and initial pointing uncertainty region (step 34). The initial pointing uncertainty region is based on the errors in the GPS coordinates, the INS measurements and impacts of any time delay. With current technology, the initial pointing uncertainty region is on the order of a few degrees. To establish a high data rate communication link for high-frequency RF in excess of 1 GHz, the width of the main lobe is on the order of a degree. Steps must be taken to reduce the pointing uncertainty region to less than the width of the main lobe to establish track in the antenna's maximum gain state to maximize the data rate.

At each platform, the computing system sets and controls the antenna such that the width of the main lobe is greater than the initial pointing uncertainty region (step 36). The main lobe of the antenna beam should be "well-formed" meaning that it is roughly approximated by a parabola. The "width" of the main lobe is typically defined as the angular diameter of the main lobe where it drops to half power from the peak (known as full-width, half-max (FWHM) or 3 dB beam width).

At each platform, the computing system initializes an extent of the scan pattern (step 38). The extent of the scan pattern is suitably set based on width of the main lobe and the pointing uncertainty region so that the received RF signal remains within the main antenna beam. The computing system initializes the data rate (step 40) based on the quality of the communication link established between the two platforms, which in turn is dictated by the pointing uncertainty region and the width of the main lobe. The initial data rate will be considerably less than the target high data rate.

At each platform, the computing system implements a Gimbal Scan Algorithm (GSA) to adjust the antenna pointing direction to establish track and update the pointing uncertainty region (step 42). For mobile platforms, the GSA receives updates from the platform's inertial navigation system (INS) (step 43). These tracking algorithms assume each processed block of received signal levels lies within the main lobe, is acquired for a fixed width of the main lobe and that a modulation of the received signal levels is solely a function of the scan pattern of the receive antenna. The first requirement that received signal levels lie within the main lobe is met by limiting the extent of the scan pattern based on the width of the main lobe. The second requirement that the data is acquired for a fixed width of the main lobe is met by reducing the width of the main lobe either in discrete steps between blocks (or every N blocks) or continuously but slowly such that the width of the main lobe is approximately fixed for each block. The last requirement is met by using orthogonal scan patterns. Each block of received signal levels represents at least one full scan pattern at the approximately fixed width of the main lobe. Gimbal scan tracking steers the antenna pointing direction in a circular pattern around a nominal pointing direction and infers pointing error from resulting changes in the Received Signal Level (RSL). The pointing error is then used in a control loop to adjust the antenna central pointing direction to converge on the received signal direction.

At each platform, once the GSA has converged to adjust the antenna pointing direction and to update the pointing uncertain region (reduce it), the computing system ascertains whether the width of the main lobe is at a minimum (step 44). If a minimum, the computing system moves to track mode (step 46) to maintain the high data rate communication link, incorporating periodic updates (step 48) from the platform's INS (if mobile). If track is lost (step 50), control returns to step 34 to compute the initial pointing direction and pointing uncertainty region to reestablish the high data rate communication link.

If the width of the main lobe has not reached its minimum, the computing system reduces its width until it is just greater than the updated and reduced width of the pointing uncertainty region (step 52). The width of the main lobe may be reduced continuously from an initial low gain broad beam width condition to the high gain narrow beam width condition where the rate of reduction is sufficiently slow that the width of the main lobe is approximately fixed for each block of received signal levels. Alternately, the width of the main lobe may be reduced in discrete steps between acquisition and processing of one or more blocks of received signal levels. In one case, the width of the main lobe is reduced in a single discrete step from an initial low gain broad beam width condition to the high gain narrow beam width condition. The computing system suitably reduces the extent of the scan pattern (step 54) so that the received signals lie within the main lobe and increases the data rate (step 56). As the uncertainty region and width of the main lobe are reduced, the data rate supported by the communication link is increased.

The computing system repeats step 42 of executing the GSA with the narrower main lobe and reduced pointing uncertainty region to further adjust the antenna pointing direction and to update (and further reduce) the pointing uncertainty region. The computing system executes this loop until the width of the main lobe reaches its minimum at step 44 at which point track is established.

Figure 3A:
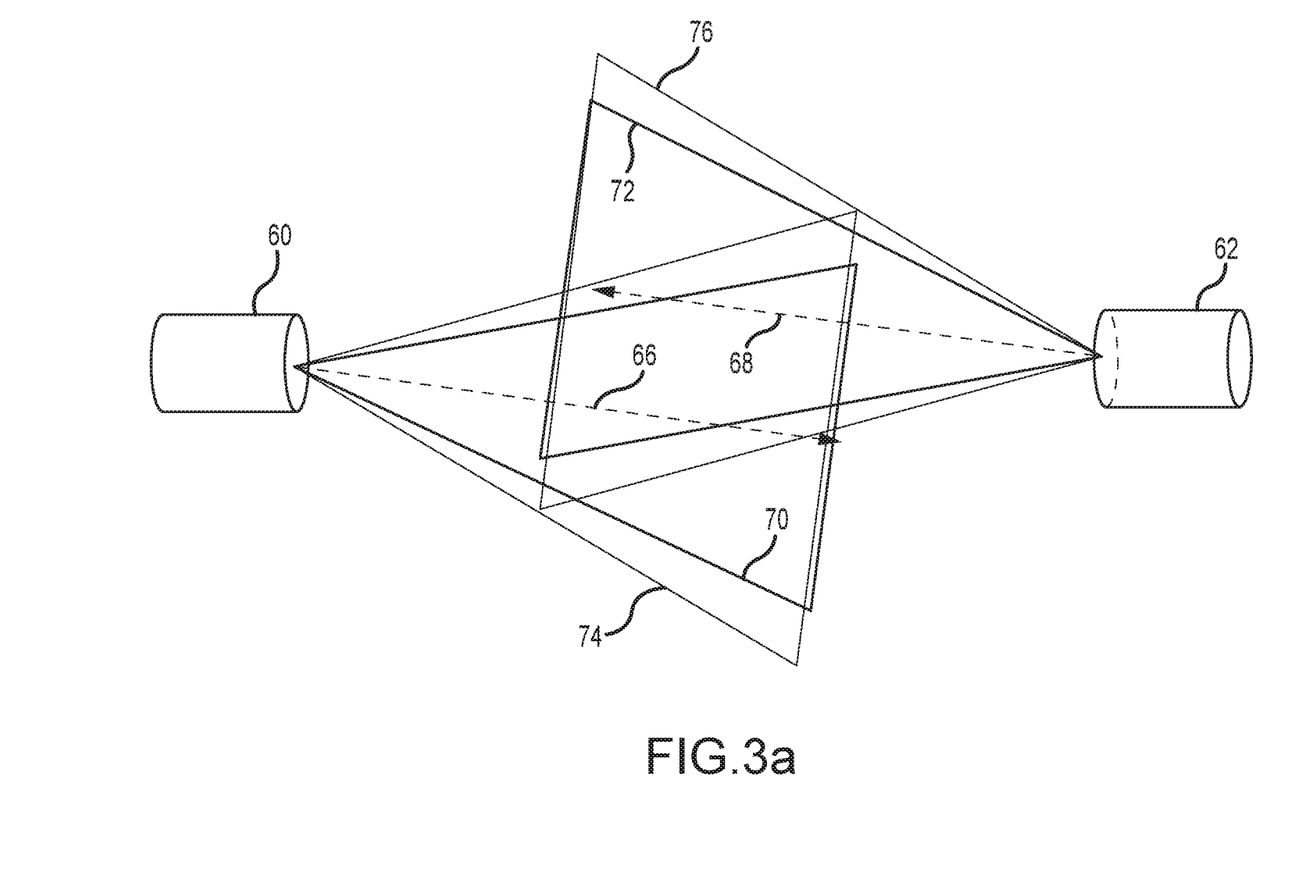
FIGS. 3a through 3c illustrate the progressive reduction of the beam width as the pointing uncertainty region is reduced.
Figure 3B:
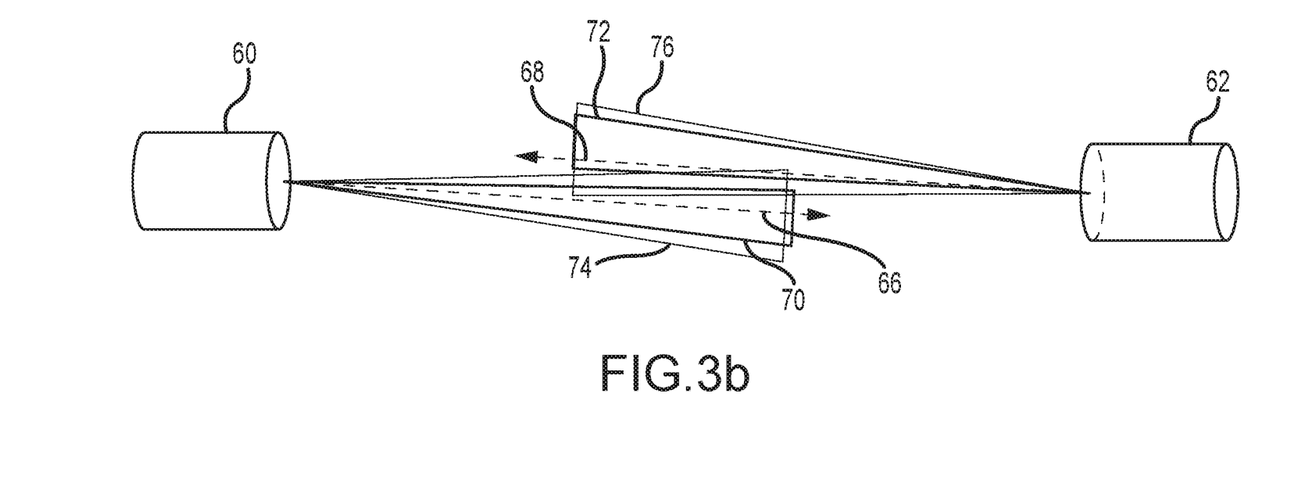
Figure 3C:
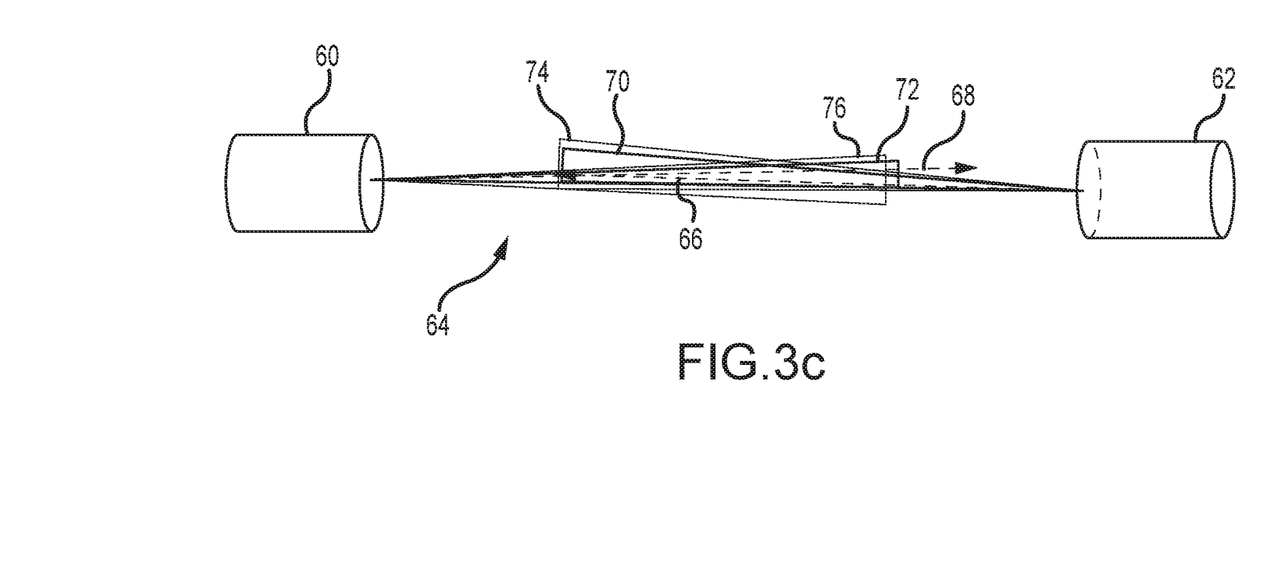

The concurrent pointing and tracking of RF transceiver antennas 60 and 62 on a pair of platforms to form a high data rate RF communication link 64 is illustrated in FIGS. 3a-3c. As shown in FIG. 3a, from coordinates of both platforms and the orientation of the platform, each platform determines a pointing direction 66 or 68 of its transceiver antenna 60 or 62 towards the opposing RF transceiver antenna 62 or 60 and a pointing uncertainty region 70 or 72. Each platform sets a width of the main lobe 74 or 76 of its transceiver antenna to be greater than the width of the pointing uncertainty region 70 or 72. The pointing uncertainty regions and main lobes are centered about the pointing direction. As shown in FIGS. 3a and 3b, with each iteration of the GSA, the pointing uncertainty region and width of the main lobe are reduced until convergence at the minimum width of the main lobe is reached and the high date rate communication link 64 is established.

The tracker works by probing with antenna aiming and using the received signal level to deduce the peak of the signal (direction of signal arrival). The variation in received signal amplitude level with antenna aim is used to find this direction. In a single tracking platform case, the change in RSL is directly related to its own aiming. In other words, the pointing scan puts amplitude modulation on the signal. The modulation is decoded into an angle error by filtering with the pseudo-inverse of the modulation matrix.

In the current dual tracking platform case both ends are simultaneously tracking. The RSL changes in accordance with the aim of both ends. There is only one RSL and it is a function of receiver aim and transmitter aim (and other parameters that are usually constant during track, e.g., antenna gain, transmit power, receive area etc.) Both the transmit and receive scans amplitude modulate the RSL. In order that the receiver not be confused by the transmit scan, it is important that the receiver decoder be insensitive to the RSL modulation caused by the transmit side (and vice-versa when the transmit-receive roles are exchanged).

The two ends need to employ orthogonal scan patterns such that the RSL modulation due to other platform scan falls in the null-space of the receiver RSL decoder. There are many possible orthogonal pairs. A particular one is frequency division. For example, one terminal may be configured to perform 2 circles during the scan period and the other to perform 3 circles. Frequency division is especially attractive as it does not require time coordination between the mobile platforms.

A Gimbal Scan Algorithm is centered about two main functions: (1) received signal level (RSL) tracking (FIG. 5) and (2) utilizing frequency division (e.g., 2:3 scan ratio) to establish orthogonality.

Figure 4:
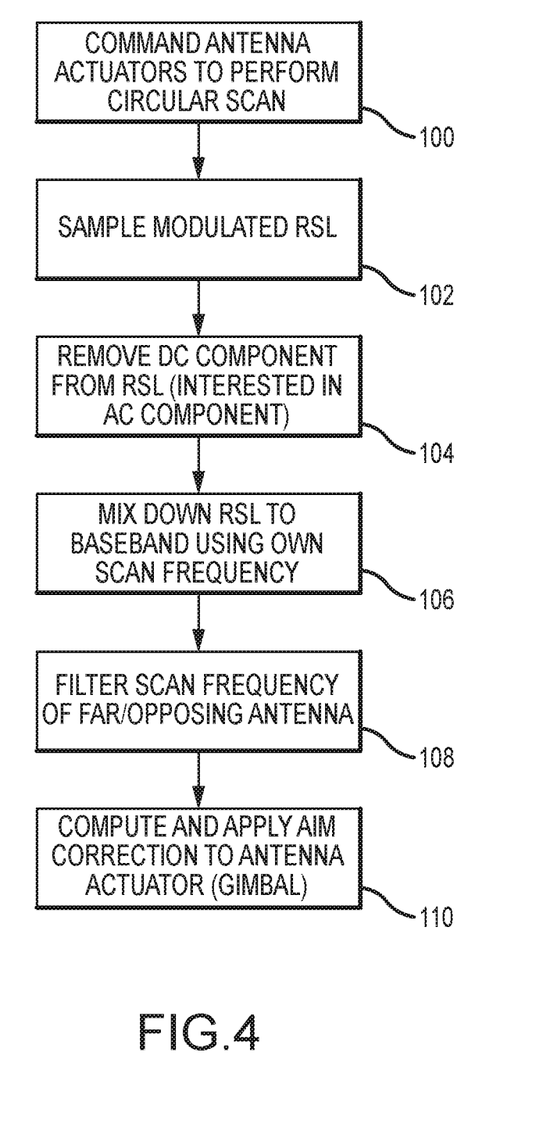
FIG. 4 is a flow diagram of an embodiment of the scan algorithm for processing blocks of received signal levels for an approximately fixed beam width.

Referring now to FIG. 4, an embodiment of the Global Scan Algorithm (step 42 of FIG. 2) comprises commanding antenna actuators (on each platform) to perform a circular scan (step 100), sampling the modulated RSL (step 102), removing the DC component from RSL to leave on the AC component (step 104), mixing down the RSL to baseband using own scan frequency (step 106), filtering the scan frequency of the far/opposing antenna (step 108) and computing and applying aim correction to the antenna actuator (step 110).

Figure 5:
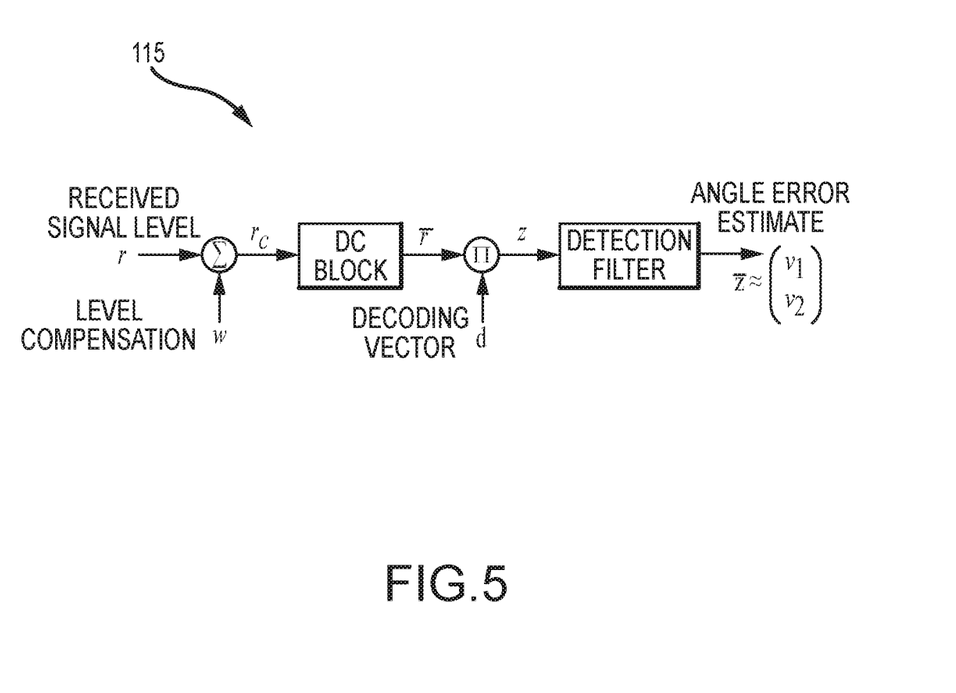
FIG. 5 is an embodiment of a demodulation circuit for received signal level tracking.

FIG. 5 illustrates an embodiment of a demodulation circuit 115 for scan demodulation processing for RSL tracking. For a constant rate circular scan path, the decoder will be cosine and sine, which mixes the scan rate to baseband. The detection filter is a low pass filter to reject noise and block harmonics of the scan frequency. Often the detection filter is a moving average over a single scan period. In this invention, both ends of the link will be performing independent gimbal scans to track each other. Both gimbal scans will consequently affect the RSL at both ends of the link. It is therefore vital that RSL variation due to one scan not confuse the scan demodulation of the other. The solution to this problem involves the use of two different scan frequencies—one for each end of the link. Each demodulator will then mix down to baseband using the scan frequency of its own antenna. A filter then blocks the other scan frequency after the mix. As it is also important to avoid harmonics of the scan frequency, a 2:3 scan frequency ratio for the two ends of the link will be employed.

Figure 6A:
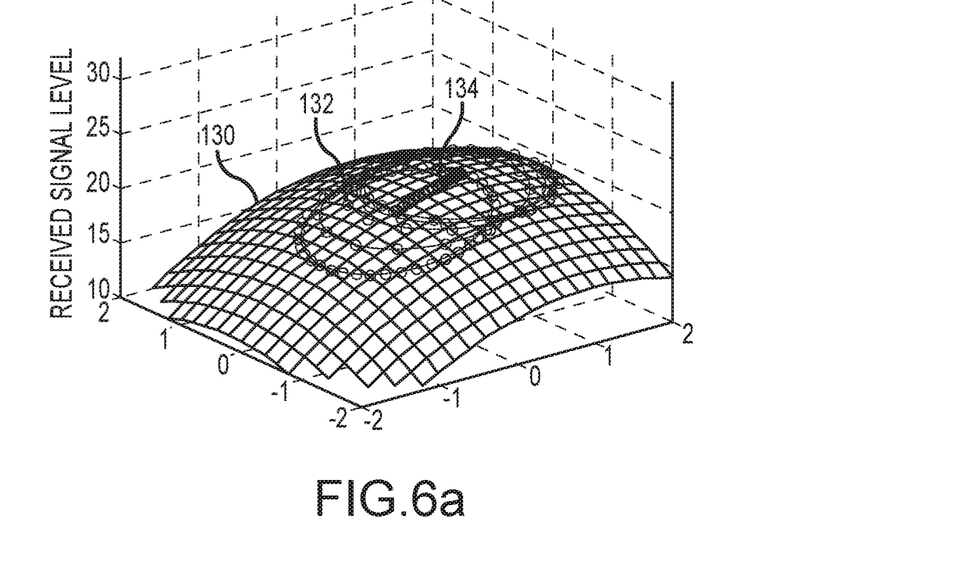
FIGS. 6a and 6b illustrate iteration of the scan algorithm for wide beam width acquisition and narrow beam width tracking, respectively.
Figure 6B:
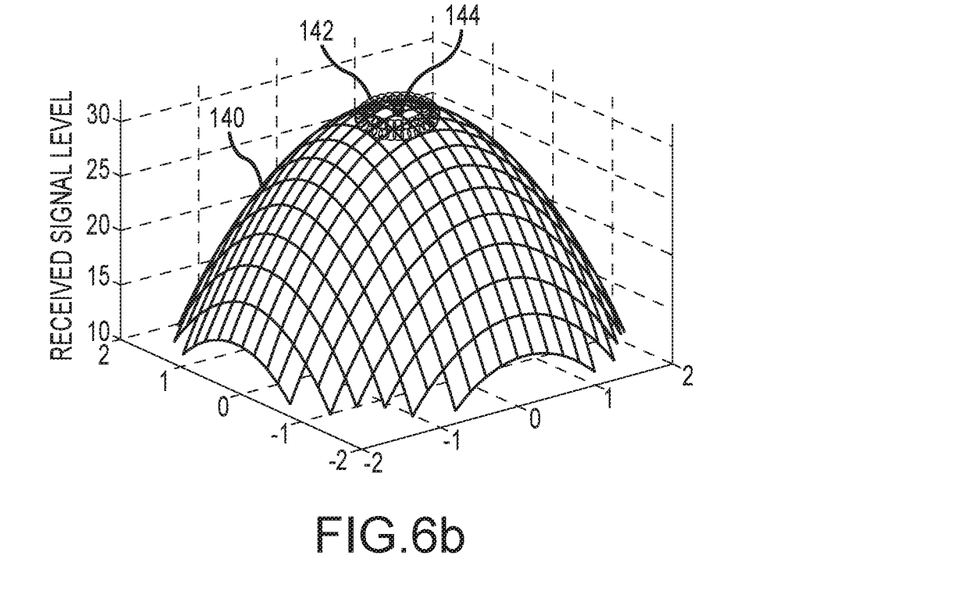

FIGS. 6a and 6b illustrate application of a GSA for acquisition and tracking, respectively. In general the figures show a 3D relative gain pattern of the proposed antenna with a pointing error represented by an arrow from the peak of the beam. The scan pattern is a circular path the antenna follows over time. When the center of the scan pattern is off the peak signal direction, the scan produces a RSL modulation of the same frequency as the scan. This RSL modulation has amplitude proportional to the magnitude of the pointing direction error and its phase relative to the scan indicates direction of error. A scan demodulator extracts this pointing error magnitude and direction. For acquisition, FIG. 6a shows a wide beam width 130 with a large scan circle 132 that loops around aim center 134. The center moves up the signal level hill to the peak. For tracking, FIG. 6b shows a narrow (focused) beam width 140 with a small scan circle 142 about the peak 144 of the hill. The scan circle keeps to the peak of the hill.

An exemplary point & track (PAT) sequence may include modes A-F. Mode A broadens the beam. Mode B conducts a spiral scan of the beam to get the antenna moving and establish the acquisition scan (no data processing). Mode C is the acquisition track mode in which, using a wide beam width, the transceiver conducts a number of scans. Each data block is processed with the GSA to give Az/El correction and the beam up the 2D parabola "hill" towards target at the peak of the hill. Mode D transitions from acquisition to course track mode. The beam width is reduced, a circle is scanned and repeated. Modes E and F for course and fine track modes use the same narrow beam width but with smaller and smaller scan circles. If more than 2 beam widths are used, the beam width can be narrowed within E and F until reach max gain condition.

Figure 7A:
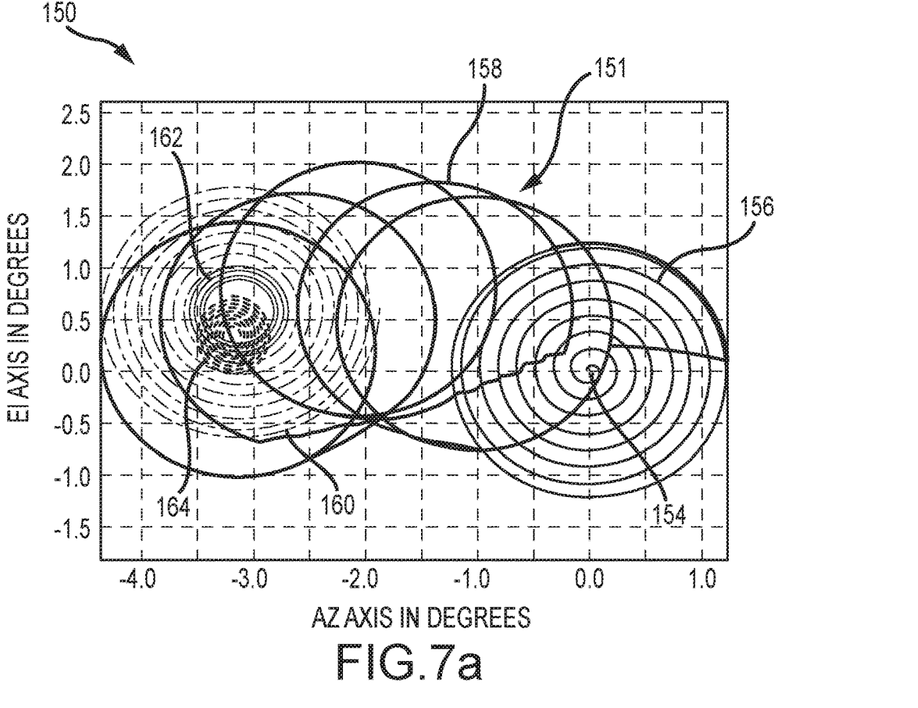
FIGS. 7a and 7b are plots of the scan patterns and modulated received signal levels for pointing and tracking.
Figure 7B:
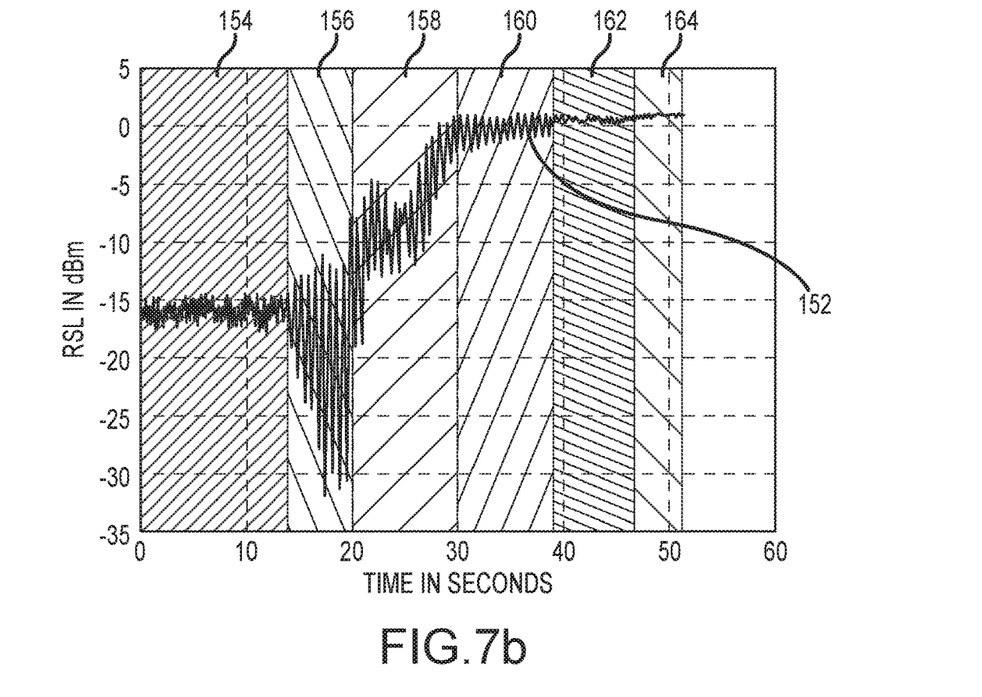

The results of an exemplary point & track sequence 150 is illustrated in FIG. 7a, showing the transceiver gimbal elevation angle vs. gimbal azimuth angle of a beam scan pattern 151 during the sequence accompanied by FIG. 7b, which shows the transceiver Receive Signal Level (RSL) 152 during the same sequence. In this sequence the opposing transceiver is positioned such that an approximate −3° azimuth and +0.5° elevation error in relation to the initial transceiver pointing direction is induced. This initial angular error is representative of the magnitude of angular error yielded by GPS in an inner boundary solution (where the two UAVs are only about 1 km apart). The PAT sequence starts with mode "A" 154 where the antenna beam is broadened (via sub-reflector actuation) to an approximately 6° beam width. As seen in FIG. 7b, the RSL level 152 is relatively low and considerably noisy due to the low antenna gain and large pointing error. In mode "B" 156 a very course "acquisition" scan (1.2°) is established over about a 5 second interval. This mode can be reduced to less than 2 seconds for Phase 2. In mode "C" 158 the acquisition tracking mode is initiated and the gimbal rapidly points to the opposing transceiver over about a 10 second interval. At this point in the sequence, the RSL level 152 is high and the transceiver is capable of a high rate data transmission. In modes "D" 160, "E" 162 and "F" 164 the acquisition scan transitions to a course gimbal scan (about 0.4°) and then to a fine gimbal scan (about 0.2°). During the fine mode track, the RSL level 152 is basically flat with only a fraction of a dB tracking loss. Note that it is believed that each of these sequence times can be significantly reduced. It's also important to note that the actual pull-in (mode "C") was accomplished in about 10 seconds. This pull in can be cut in half by doubling the gimbal scan rate. The acquisition time will be in the 5-10 second range.

As the gimbal track method is much slower than the shadow motion, this should be accounted for with a local INS/IMU mounted in each pod. Heading, pitch and roll rate information from the pod IMU will be used to continually space-stabilize the antennas (absolute errors in heading, pitch and roll, as well as movement of the opposing UAV, are inconsequential once gimbal track is established).

Figure 8A:
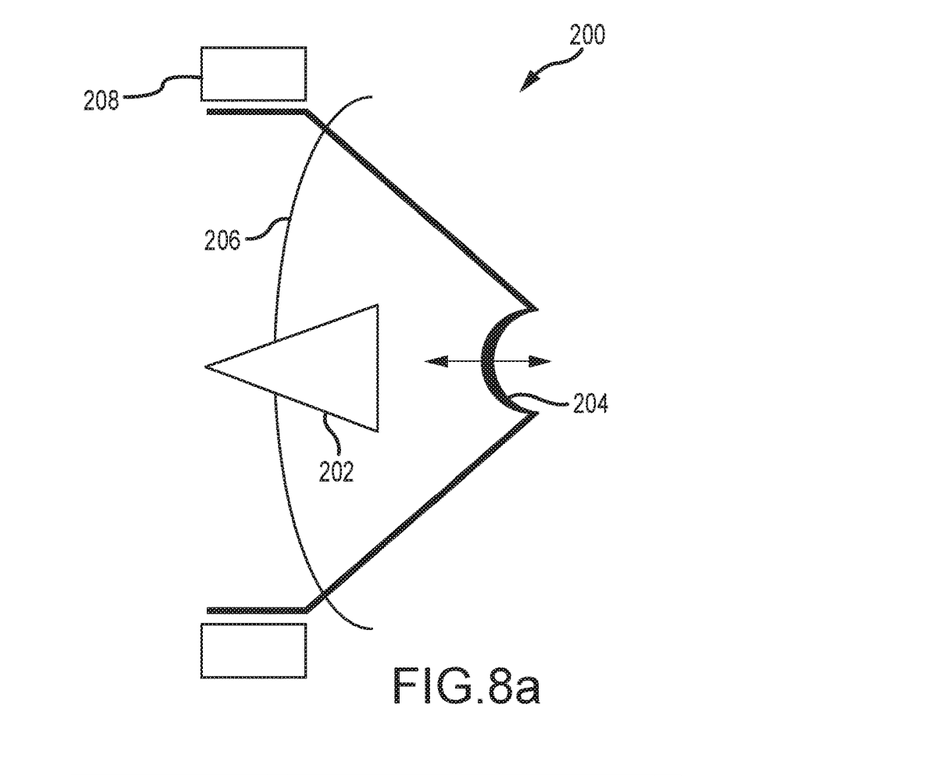
FIGS. 8a and 8b are diagrams of an embodiment for axial translation of a sub-reflector to defocus and focus the beam to vary its width.
Figure 8B:
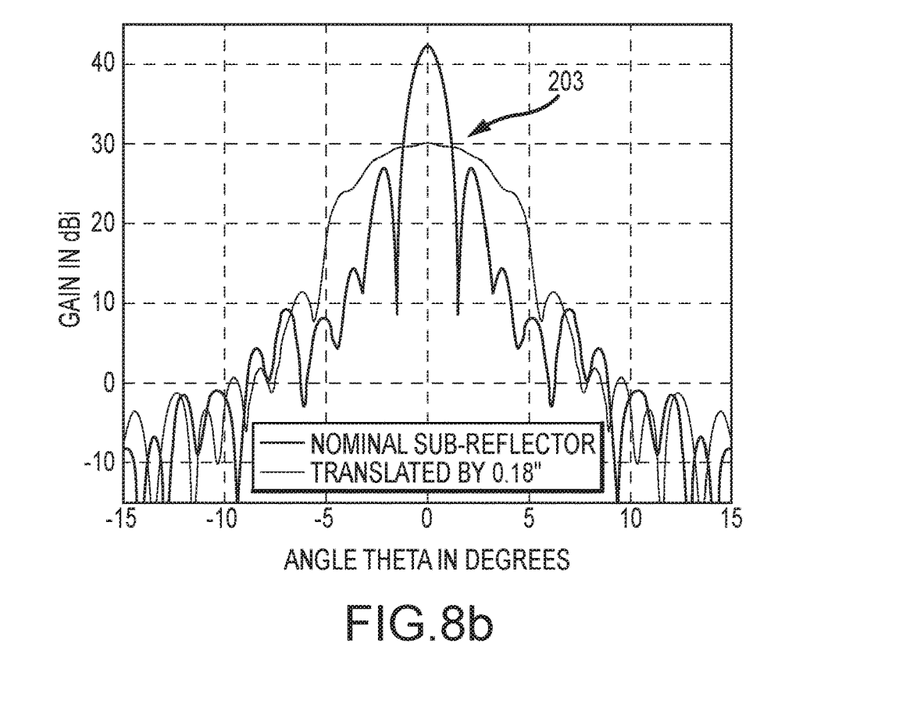

Referring now to FIGS. 8a and 8b, an Axially Displaced Ellipse (ADE) gimbaled reflector-type antenna 200 allows for high efficiency with a very small focal point-to-antenna diameter ratio (F/D) e.g., less than 1. The small F/D maintains a well-formed broadened antenna pattern as the sub-reflector is actuated. The reflector-type antenna 200 comprises an RF feed 202, a sub-reflector 204 and a main reflector 206. The RF feed emits an RF beam 203 that is reflected off of sub-reflector 204 back to the main reflector 206 and forward. A drive 208 varies the position of the sub-reflector in-and-out by linearly moving a strut mechanism 210 that supports the sub-reflector. This strut mechanism is supported by three linear bearings. At the back of the main reflector, a stepper motor/worm drive moves the strut assembly/sub-reflector back and forth, relative to the main reflector. This movement effectively changes the focus of the antenna, resulting in a broadening of the beam 203.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of pointing and tracking radio frequency (RF) transceiver antennas on platforms to form an RF communication link, comprising:
   a) providing a first platform having a steerable RF transceiver antenna, said transceiver antenna configured to transmit and receive with a beam pattern having a main lobe and side lobes, said transceiver antenna configurable to vary the width of the main lobe;
   b) providing a second platform having a steerable RF transceiver antenna, said transceiver antenna configured to transmit and receive with a beam pattern having a main lobe and side lobes, said transceiver antenna configurable to vary the width of the main lobe;
   c) at each platform, from coordinates of both the first and second platforms and orientation of that platform, determining a pointing direction of the RF transceiver antenna towards the opposing RF transceiver antenna and a pointing uncertainty region;
   d) at each platform and concurrently, setting the width of the main lobe greater than the pointing uncertainty region and scanning the beam pattern over a scan pattern to transmit an RF signal to and receive an RF signal from the RF transceiver on the other platform within the main lobe, acquiring a block of received signal levels for an approximately fixed width of the main lobe, and processing a modulation of the received signal levels to update the pointing direction and reduce the pointing uncertainty region of the RF transceiver antenna to track the opposite RF transceiver antenna; and
   e) repeating step d with progressively narrower widths of the main lobe greater than the reduced pointing uncertainty region until the width of the main lobe reaches a high gain narrow beam width condition to form the RF communication link.

2. The method of claim 1, wherein the scan patterns of the opposing RF transceiver antennas are substantially orthogonal to each other for at least a primary component of the scan pattern such that the demodulation of the received signal levels to signal direction of arrival is a function of only the scan pattern of that transceiver antenna and not the scan pattern of the opposing transceiver antenna despite the signal level varying due to the scan pattern and a pointing error of both antennas within the pointing uncertainty region.

3. The method of claim 2, wherein the scan patterns are substantially orthogonal to each other for the primary component and at least one harmonic component of the scan pattern.

4. The method of claim 2, wherein the transceiver antennas are scanned over the scan pattern at different rates so that the scan patterns are orthogonal in frequency.

5. The method of claim 1, further comprising reducing the extent of the scan pattern with the reduction in the width of the main lobe so that the received RF signal remains within the main lobe.

6. The method of claim 1, wherein the block of received signal levels represents at least one full scan pattern at the approximately fixed width of the main lobe.

7. The method of claim 1, wherein the width of the main lobe is set just greater than the pointing error.

8. The method of claim 1, wherein the width of the main lobe is continuously reduced from an initial low gain broad beam width condition to the high gain narrow beam width condition, wherein the rate of reduction is sufficiently slow that the width of the main lobe is approximately fixed for each block of received signal levels.

9. The method of claim 1, wherein the width of the main lobe is reduced in discrete steps between acquisition and processing of one or more blocks of received signal levels.

10. The method of claim 1, wherein the width of the main lobe is reduced in a single discrete step from an initial low gain broad beam width condition to the high gain narrow beam width condition.

11. The method of claim 1, wherein each said steerable RF transceiver antenna comprises a gimbaled reflector-type antenna comprising a main reflector having a focal point, a sub-reflector nominally positioned at the focal point and an RF feed, wherein width of the main antenna beam is initially set by axially translating the sub-reflector away from the focal point to defocus the beam and wherein the width of the main antenna beam is reduced by axially translating the sub-reflector towards the focal point to focus the beam.

12. The method of claim 11, wherein the focal point to antenna diameter ratio (F/D) is less than 1.

13. The method of claim 11, wherein the reflector-type antenna further comprises:
   a sub-reflector strut system comprising a plurality of struts, each strut attached at one end to the sub-reflector and extending radially and backwards past the main reflector; and
   a stepper motor mounted behind the main reflector to drive the sub-reflector strut system axially to translate the sub-reflector.

14. The method of claim 13, wherein the stepper motor comprises either a turn-screw or solenoid stepper motor.

15. The method of claim 1, wherein the RF communication link is above 1 GHz.

16. The method of claim 1, wherein said first and second platforms are mobile platforms.

17. The method of claim 1, wherein said first and second platforms are fixed platforms.

18. The method of claim 1, wherein said first platform is a mobile platform and said second platform is a fixed platform.

19. A method of pointing and tracking radio frequency (RF) transceiver antennas on platforms to form an RF communication link, comprising:
   a) providing a first platform having a steerable RF transceiver antenna, said transceiver antenna configured to transmit and receive with a beam pattern having a main lobe and side lobes, said transceiver antenna configurable to vary the width of the main lobe;
   b) providing a second platform having a steerable RF transceiver antenna, said transceiver antenna configured to transmit and receive with a beam pattern having a main lobe and side lobes, said transceiver antenna configurable to vary the width of the main lobe;
   c) at each platform, from coordinates of both the first and second platforms and orientation of that platform, determining a pointing direction of the RF transceiver antenna towards the opposing RF transceiver antenna and a pointing uncertainty region;
   d) at each platform and concurrently, setting the width of the main lobe greater than the pointing uncertainty region and scanning the beam pattern over a scan pattern to transmit an RF signal to and receive an RF signal from the RF transceiver on the other platform within the main lobe, acquiring a block of received signal levels for at least one full scan pattern for an approximately fixed width of the main lobe, and processing a modulation of the received signal levels to update the pointing direction and reduce the pointing uncertainty region of the RF transceiver antenna to track the opposite RF transceiver antenna, wherein the scan patterns of the opposing RF transceiver antennas are substantially orthogonal to each other for at least a primary component of the scan pattern such that the demodulation of the received signal levels to signal direction of arrival is a function of only the scan pattern of that transceiver antenna and not the scan pattern of the opposing transceiver antenna despite the signal level varying due to the scan pattern and a pointing error of both antennas within the pointing uncertainty region; and e) repeating step d with progressively narrower widths of the main lobe greater than the reduced pointing uncertainty region and progressively smaller extents of the scan pattern so that received RF signal remains within the main lobe until the width of the main antenna beam reaches a high gain narrow beam width condition to form the RF communication link.

20. A method of pointing and tracking radio frequency (RF) transceiver antennas on platforms to form an RF communication link, comprising:
   a) providing a first platform having a steerable RF transceiver antenna, said transceiver antenna configured to transmit and receive with a beam pattern having a main lobe and side lobes, said transceiver antenna configurable to vary the width of the main lobe;
   b) providing a second platform having a steerable RF transceiver antenna, said transceiver antenna configured to transmit and receive with a beam pattern having a main lobe and side lobes, said transceiver antenna configurable to vary the width of the main lobe;
   c) at each platform, from coordinates of both the first and second platforms and orientation of that platform, determining a pointing direction of the RF transceiver antenna towards the opposing RF transceiver antenna and a pointing uncertainty region
   d) at each platform and concurrently, setting the width of the main lobe to an initial broad width and scanning the beam pattern over a scan pattern to transmit an RF signal to and receive an RF signal from the RF transceiver on the other platform, acquiring received signal levels, and processing the received signal levels to update the pointing direction and reduce the pointing uncertainty region of the RF transceiver antenna, wherein the scan patterns of the opposing RF transceiver antennas are substantially orthogonal to each other for at least a primary component of the scan pattern such that a demodulation of the received signal levels is a function of only the scan pattern of that transceiver antenna and not the scan pattern of the opposing transceiver antenna despite the signal level varying due to the scan pattern and a pointing error of both antennas within the pointing uncertainty region; and
   e) repeating step d with progressively narrower widths of the main lobe until the width of the main lobe reaches a high gain narrow beam width condition to track the opposing RF transceiver antenna to form the RF communication link.

21. The method of claim 20, wherein the scan patterns are substantially orthogonal to each other for the primary component and at least one harmonic component of the scan pattern.

22. The method of claim 20, wherein the transceiver antennas are scanned over the scan pattern at different rates so that the scan patterns are orthogonal in frequency.

* * * * *

UNITED STATES PATENT AND TRADEMARK OFFICE
CERTIFICATE OF CORRECTION

PATENT NO. : 10,833,405 B2
APPLICATION NO. : 15/760429
DATED : November 10, 2020
INVENTOR(S) : Brown et al.

Page 1 of 1

It is certified that error appears in the above-identified patent and that said Letters Patent is hereby corrected as shown below:

In the Specification

In Column 1, Line 9, after "following", insert --co-pending--

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*